(12) United States Patent
Hansen et al.

(10) Patent No.: US 6,453,889 B1
(45) Date of Patent: Sep. 24, 2002

(54) METHOD FOR THE COMBUSTION OF FUEL RICH HYDROCARBONS IN A COMBUSTION CHAMBER WITH REDUCED SOOT FORMATION

(75) Inventors: Tommy Hansen, Tikøb (DK); Niels Jørgen Blom, Hillerød (DK)

(73) Assignee: Haldor Topsoe A/S, Lyngby (DK)

( * ) Notice: Subject to any disclaimer, the term of this patent is extended or adjusted under 35 U.S.C. 154(b) by 0 days.

(21) Appl. No.: 09/992,298

(22) Filed: Nov. 14, 2001

Related U.S. Application Data
(60) Provisional application No. 60/252,521, filed on Nov. 22, 2000.

(51) Int. Cl.$^7$ .................................................. F23B 7/00
(52) U.S. Cl. ........................................................ 123/536
(58) Field of Search ............................... 123/536, 537, 123/538, 539

(56) References Cited

U.S. PATENT DOCUMENTS

| | | | |
|---|---|---|---|
| 4,091,779 A | | 5/1978 | Saufferer et al. |
| 4,587,807 A | * | 5/1986 | Suzuki ........................ 123/536 |
| 5,027,764 A | * | 7/1991 | Reimann ..................... 123/536 |
| 5,061,462 A | * | 10/1991 | Suzuki ........................ 123/536 |

FOREIGN PATENT DOCUMENTS

| | | |
|---|---|---|
| AU | 13814/76 | 11/1977 |
| DE | 22 53 249 | 5/1974 |
| DE | 24 56 163 | 8/1976 |

OTHER PUBLICATIONS

Masahiro Saito et al. "Control of Soot Emitted from Acetylene Diffusion Flames by Applying an Electric Field," *Combustion and Flame*, vol. 119, pp. 356–366 (1999).

S.L. K. Witting et al. "Radical and Chemi–ion Precursors: Electric Field Effects in Soot Nucleation", American Chemical Society, Chap. 11, pp. 167–177 (1976).

\* cited by examiner

*Primary Examiner*—Marguerite McMahon
(74) *Attorney, Agent, or Firm*—Dickstein Shapiro Morin & Oshinsky, LLP

(57) ABSTRACT

Method for the depression of soot formation during combustion of fuel rich hydrocarbons in a combustion chamber by applying an electrostatic field in the combustion chamber by means of one or more electrodes at least a portion of the electrodes extend into the chamber, wherein the portion of the electrodes extending into the chamber comprises porous ceramic material.

8 Claims, No Drawings

METHOD FOR THE COMBUSTION OF FUEL RICH HYDROCARBONS IN A COMBUSTION CHAMBER WITH REDUCED SOOT FORMATION

This application claims benefit of application Ser. No. 60/252,521 filed Nov. 22, 2000.

The present invention is directed to hydrocarbon combustion in general. In particular, the invention provides a method for the combustion of fuel rich hydrocarbons in diesel engines or oil burners, wherein formation of soot is substantially suppressed in the fuel combustion chamber by suppressing soot forming reactions, which otherwise proceed during combustion of fuel being rich in higher hydrocarbons.

Data from the literature on ion chemistry in flame reactions, e.g. in H. F. Calcote, D. G. Keil, "The role of ions in soot formation", Pure & Appl. Chem., Vol. 62, No. 5 (1990), show that formation of soot proceeds by an ionic mechanism, wherein propargyl or cyclo propenyl chemiions $C_3H_3^+$ is the main precursor of soot.

$C_3H_3^+$ ions are formed during combustion of fuel by reaction of methine radicals CH* with oxygen:

  (1)

followed by the reactions:

  (2)

  (3)

The highly reactive propargyl ions react with hydrocarbons being present in fuel combustion gas. Soot is finally formed in a fast sequence of condensation reactions initiated by addition of propargyl ions to acetylene molecules in the gas and further hydrocarbon additional reactions with the initial ionic condensation products of propargyl ions and acetylene molecules.

Soot in exhaust gas from fuel combustion represents a serious environmental and health risk and removal or reduction of soot emission in exhaust gas is at present prescribed by environmental regulations.

We have found that application of an electrostatic field in a fuel combustion chamber during combustion of fuel rich hydrocarbons reduces or substantially prevents formation of soot in the combustion chamber of e.g. a diesel engine and oil burner. Formation of $C_3H_3^+$ and higher ionic hydrocarbon species resulting from additional reactions is substantially suppressed by the electrostatic field presumably because of unfavourable equilibrium conditions for the formation of the $CHO^+$ precursor in the above reaction (1) in an electrostatic field.

An electrostatic field inside a fuel combustion chamber is obtained by arranging one or more electrodes in the chamber. Voltage may be applied to the electrodes constantly or at variable levels depending on fuel load. In a diesel engine, the electrodes may be a part of the fuel preheating system installed in the engine combustion chamber.

Use of an electrostatic field in the depression of soot formation is known from U.S. Pat. No. 4,091,779. The problem with this known method is that soot deposits on surface of the electrode during operation. Soot on the electrode surface decreases the strength of the electrostatic field in the combustion chamber.

We have thus found that when coating the conductive part of the electrode with a porous ceramic material being permeable to oxygen, soot is continuously burnt off from the electrode surface.

Preferably, at least the part of the electrode extending into the combustion chamber is coated or otherwise provided with zirconium dioxide.

Based on the above findings and observations, this invention provides a method for the combustion of fuel being rich in hydrocarbons at reduced formation of soot by applying within a fuel combustion chamber an electrostatic field and thereby suppressing formation of soot from ionic species being formed during the combustion of the fuel.

The method of this invention may further be applied to reduction of other noxious compounds in exhaust gas from hydrocarbon combustion including reduction of nitrogen oxides, dioxines and aldehydes.

EXAMPLE

Diesel fuel (Statoil) was combusted in a conventional oil burner with a metallic orifice. Two steel electrodes in form of 1 mm needles were mounted in the combustion zone in front of the burner (one 1 electrode adjacent to the flame starting point and one electrode 10 mm above the flame top).

The amount of soot being formed during combustion of the fuel was measured in the flue gas from the combustion zone by means of a Bosch Soot Monitor (model EFAW 6GA).

Soot as measured in the flue gas is expressed by the so-called Bosch number. The Bosch number is dependent on the amount of soot so that high Bosch numbers indicate large amounts of soot.

During combustion of the diesel fuel, an increasing electrostatic field was provided in the combustion zone by applying increasing voltage to the electrodes.

Results obtained at voltages between 2000V and 6000V are summarized below.

| Bosch Number | Voltage |
|---|---|
| 3.8 | 0 |
| 3.7 | 2000 |
| 2.7 | 4000 |
| 2.4 | 5000 |
| 2.0 | 6000 |

As apparent from the above results, the amount of soot in the flue gas decreases linearly at increasing voltage.

What is claimed is:

1. Method for the depression of soot formation during combustion of fuel rich hydrocarbons in a combustion chamber by applying an electrostatic field in the combustion chamber by means of one or more electrodes at least a portion of the electrodes extend into the chamber, wherein the portion of the electrodes extending into the chamber comprises porous ceramic material.

2. Method according to claim 1, wherein the porous ceramic material is zirconium dioxide.

3. Method according to claim 1, wherein the electrostatic field is maintained with constant voltage to the electrodes.

4. Method according to claim 1, wherein the electrostatic field is applied by applying variating voltage electrodes.

5. Method according to claim 1, wherein the combustion chamber is part of a diesel engine.

6. Method according to claim 2, wherein the combustion chamber is part of a diesel engine.

7. Method according to claim 3, wherein the combustion chamber is part of a diesel engine.

8. Method according to claim 4, wherein the combustion chamber is part of a diesel engine.

* * * * *